(12) United States Patent
Mosek

(10) Patent No.: US 8,627,029 B2
(45) Date of Patent: Jan. 7, 2014

(54) METHODS FOR MANAGING FILES ACCORDING TO APPLICATION

(75) Inventor: Amir Mosek, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 208 days.

(21) Appl. No.: 11/806,705

(22) Filed: Jun. 4, 2007

(65) Prior Publication Data

US 2008/0222208 A1 Sep. 11, 2008

Related U.S. Application Data

(60) Provisional application No. 60/893,635, filed on Mar. 8, 2007.

(51) Int. Cl.
*G06F 12/00* (2006.01)
(52) U.S. Cl.
USPC ..... 711/163; 711/103; 711/147; 711/E12.038
(58) Field of Classification Search
USPC .......................................................... 711/154
See application file for complete search history.

(56) References Cited

U.S. PATENT DOCUMENTS

| | | | | |
|---|---|---|---|---|
| 5,902,352 A * | 5/1999 | Chou et al. | ..................... | 718/102 |
| 6,907,421 B1 * | 6/2005 | Keshav et al. | ..................... | 707/2 |
| 6,910,210 B1 * | 6/2005 | Chew | ........................... | 718/103 |
| 7,020,668 B2 * | 3/2006 | Matsuda et al. | ............... | 707/206 |
| 7,099,869 B1 * | 8/2006 | Forstall et al. | ................... | 707/10 |
| 7,203,737 B2 * | 4/2007 | Starbuck et al. | .............. | 709/219 |
| 7,328,217 B2 * | 2/2008 | Borthakur et al. | ............ | 707/100 |
| 2002/0152229 A1 | 10/2002 | Peng | | |
| 2003/0225801 A1 * | 12/2003 | Devarakonda et al. | ....... | 707/205 |
| 2004/0143736 A1 * | 7/2004 | Cross et al. | .................... | 713/165 |
| 2005/0027754 A1 * | 2/2005 | Gajjar et al. | .................. | 707/200 |
| 2005/0160428 A1 * | 7/2005 | Ayachitula et al. | ........... | 718/104 |
| 2005/0193025 A1 | 9/2005 | Mosek | | |
| 2005/0256838 A1 | 11/2005 | Lasser | | |
| 2006/0064488 A1 * | 3/2006 | Ebert | ........................... | 709/225 |
| 2007/0143768 A1 * | 6/2007 | Inami et al. | ................... | 718/104 |
| 2007/0283115 A1 * | 12/2007 | Freeman et al. | .............. | 711/163 |

* cited by examiner

*Primary Examiner* — Matthew Bradley
*Assistant Examiner* — Arvind Talukdar
(74) *Attorney, Agent, or Firm* — Martine Penilla Group, LLP

(57) ABSTRACT

The present invention discloses systems for managing files according to an application. A method for accessing files in a digital storage device, the method including steps of: providing an application having an application identity; and adjusting a storage mode of a file according to the application identity upon the application accessing the file. Preferably, the step of providing includes providing a process identifier (PID) that is an indicator of the application identity. Preferably, the step of adjusting includes adjusting the storage mode according to a storage command associated with an application scenario of the application. Preferably, the step of adjusting is performed using a storage attributes table (SAT). Preferably the step of adjusting is performed using an application scenario table (AST).

9 Claims, 4 Drawing Sheets

METHODS FOR MANAGING FILES ACCORDING TO APPLICATION

RELATED APPLICATIONS

This patent application claims priority under 35 U.S.C. §119(e) to U.S. Provisional Application No. 60/893,635, filed Mar. 8, 2007, which is hereby incorporated by reference in its entirety.

This patent application is related to U.S. patent application Ser. No. 11/806,704 of the same inventors, which is entitled "METHOD FOR MANAGING FILES ACCORDING TO APPLICATION" and filed on the same day as the present application. This patent application, also claiming priority to U.S. Provisional Application No. 60/893,635, is incorporated in its entirety as if fully set forth herein.

FIELD AND BACKGROUND OF THE INVENTION

The present invention relates to methods for managing files according to application.

File-storage management is a well-known function in the art of computer engineering. Substantial effort is made to optimize the way files are stored and managed in non-volatile storage systems in order to optimize the speed, reliability, power consumption, and security level of the stored files.

Traditional storage devices are unable to discriminate between different storage circumstances, and therefore treat the stored files in a generally-optimal way, without adapting the file management to parameters that may vary among different storage-access scenarios.

Two patent applications, U.S. patent application Ser. No. 10/849,234 and U.S. patent application Ser. No. 10/952,837, both of SanDisk IL Ltd., Kefar Saba, Israel, significantly improve the performance of storage devices by making the flash-management attributes dependent upon the content of the stored data. Such an approach is clearly described in detail in the abovementioned applications. The abovementioned prior art indeed teach how to adapt the storage management of a file, based on attributes derived from the file type, such that a streaming music file (e.g. MP3 extension), for example, is treated differently than a text file (e.g. DOC extension).

However, according to the prior art, a file is always treated in the same way, regardless of which application accessed the file. Such a situation leaves much to be desired in terms of optimal storage management.

The following example shows how a file type (e.g. MP3 file) has different storage requirements when accessed by one application (e.g. music-player application) versus another application (e.g. a file-copying application). A music-rendering application (e.g. Microsoft™ Windows™ Media Player) requires that an MP3 file be treated with a fixed reading bit rate and low power consumption, but could tolerate a lower reliability.

In contrast, a file-copying application (e.g. Microsoft ActiveSync) would prefer to have the same MP3 file be treated with a fast reading speed and a high reliability, but could tolerate an unstable bit rate.

Therefore, it is clear that different applications would be optimally served by application-specific file management with respect to read and write performance, reliability level (e.g. error-correction algorithms), security, housekeeping, wear leveling, and the mapping of the logical files to physical pages and blocks in flash memory, for example. Unfortunately, in the prior-art systems, the identity of an application that accesses a file is not taken into consideration by flash-management systems.

It would be desirable to have methods for taking into consideration the application that issues a storage-access command when fulfilling the command.

SUMMARY OF THE INVENTION

It is the purpose of the present invention to provide methods for managing files according to application.

For the purpose of clarity, several terms which follow are specifically defined for use herein. The term "file" is used herein to refer to a digital data file, or any data object, that is managed by a storage system. The term "block" is used herein to refer to a basic storage sub-area that can be read, written, and erased. Some storage technologies enable some of the three operations (i.e. read, write, and erase) to be performed on parts of a block (e.g. pages).

The terms "digital rights management" and "DRM" are used herein to refer to a secure technology that enables the copyright owner of a piece of intellectual property (e.g. music, video, and text files) to specify what a user is allowed to do with the property. In DRM, a DRM entity (e.g. a song file) is associated with a "rights object" file or header.

The terms "operating system" and "OS" are used herein to refer to a software program, executed by a host-system, capable of providing file-system services, via API (application programming interfaces), to other applications (e.g. Windows). The terms "file system" and "FS" are used herein to refer to a software module included in OS software. The FS is responsible for managing memory (both non-volatile and volatile) using logical addresses that index files using an FS-specific format. APIs for deleting, creating, renaming, reading, and writing files and directories by their names, without knowing the storage-device type, the data format of the FS, and the physical locations of the files in the memory, are exported by the FS to applications.

The term "application launch" is used herein to refer to a process that occurs when an OS (e.g. Windows Mobile by Microsoft, Seattle, Wash., USA) reads an application file from an NVM (non-volatile memory), converts the application file format to an OS-specific process format, and writes the newly-formatted application file into the NVM. When the application launch is completed, the file is ready to be executed by the OS. The term "application identity" is used herein to refer to a name of an application that specifies what the application is.

The terms "single-level cell" and "SLC" are used herein to refer to a memory that stores one bit in each cell. A bit can be stored in a cell by charging the cell at one out of two available voltage levels. One voltage level represents one-logic and the other voltage level represents zero-logic. An SLC device provides faster transfer speeds, lower power consumption, and higher cell endurance. SLC flash-memory technology is used in high-performance memory cards.

The terms "multi-level cell" and "MLC" are used herein to refer to a flash memory that stores two or more bits in each cell. Two or more bits can be stored in one cell by charging the cell in one of four (or more) available voltage levels. For example, if the MLC stores two bits per cell, then one voltage level (of the combined two bits in the cell) represents zero-logic, the second voltage level represents one-logic, the third voltage level represents two-logic, and the fourth voltage level represents three-logic. By storing more bits per cell, an MLC memory card achieves slower transfer speeds, higher power consumption, and lower cell endurance than an SLC memory card. However, MLC manufacturing costs are lower than SLC manufacturing costs. MLC flash-memory technology is mostly used in standard memory cards.

The term "storage sub-area" is used herein to refer to a collection of logical blocks in a storage device. The term "physical sub-area" is used herein to refer to a collection of contiguous physical block addresses having uniform storage attributes. The term "logical sub-area" is used herein to refer to a collection of sequential logical block addresses having uniform storage attributes. The term "virtual sub-area" is used herein to refer to a not-necessarily-sequential collection of logical block addresses having uniform storage attributes.

The term "storage attributes" is used herein to refer to parameters that describe the performance of sub-areas in a storage device. Examples of such storage attributes include read speed, endurance, power consumption, and reliability. The terms "storage attribute table" and "SAT" are used herein to refer to a table that lists attributes of sub-areas in a storage device.

The term "application scenario" is used herein to refer to a combination of: (1) one or more application identities, (2) one or more file types, and (3) one or more storage operations or commands that are associated with specific storage requirements in a storage system. Each of these three elements is called an "application-scenario parameter" (e.g. the identity of an application is an application-scenario parameter). Any application has an application scenario under which operations and commands are executed. The terms "storage operation" and "storage command" are used herein to refer to a command that involves a host system accessing one of its storage devices.

The terms "application scenario table" and "AST" are used herein to refer to a table that matches application scenarios with storage requirements. The term "storage mode" is used herein to refer to a collection of parameters that determine the way a file is read from and written to an NVM. These parameters include the priority of the execution of the storage operation, the timing punctuality required, the buffer size for accessing the storage device, the need to run or suspend housekeeping operations during read/write operations, the use of DMA (direct memory access), and the need to save power in the storage device. The storage mode also determines a preferred storage sub-area and the writing mode, such as sequential writing (i.e. writing to sequential logical or physical addresses).

The present invention teaches methods for optimizing a flash-memory management system based on the recognition of the application scenario or at least the identity of the application that issues a storage-access command, and accesses files stored in the flash memory.

An essential feature of the present invention is the use of application-related information when processing storage-access commands. In preferred embodiments of the present invention, the storage sub-areas and storage modes allocated to the data are selected in accordance with the identity of the application or the application scenario.

For clarity, the description below refers to a narrow application scenario, which is combining one application, one file type, and one storage command. However, it should be noted that application scenario is defined to cover any combination of values for each of the application-scenario parameters including the combination of one application with any file type and any storage command.

Tables 1A and 1B highlight the differences between the present invention and the prior art (mentioned in the Background section) by showing how a file is handled differently in different application scenarios. Details are provided in the Description section below.

TABLE 1A

Preferred storage attributes of two applications for an MP3 file, according to a preferred embodiment of the present invention.

| File Type | Application Scenario | |
|---|---|---|
| MP3 File Main Requirement: | ActiveSync Fast read | Media Player Constant bit rate |

TABLE 1B

Preferred storage attributes of two applications for a DOC file, according to a preferred embodiment of the present invention.

| File Type | Application Scenario | |
|---|---|---|
| DOC File Main Requirement: | ActiveSync Fast write | Word Endurance |

In preferred embodiments of the present invention, the storage device exports an SAT, which lists the relevant attributes of its storage sub-areas, to the FS of the host system. Such an SAT is shown in Tables 1A and 1B. The FS uses such an SAT to allocate an optimal storage sub-area in the storage device for each application scenario. In order to do accomplish such a task, the host system has an AST database that specifies the preferred storage attributes for each application scenario.

Such an AST database can be generated during development or customized during use in any of the following situations:

(1) provided as a default setting by the OS (e.g. pre-installed in Windows);
(2) created by the FS developer (e.g. SureFS available from SanDisk IL Ltd.);
(3) created by the system integrator during developm65 vvmx b ent (e.g. N60 mobile-phone series available from Nokia Corporation, New York); and
(4) customized by the application during application runtime (e.g. Activision in the Doom videogame, available from id Software, Mesquite, Tex.).

In a preferred embodiment of the present invention, when an application uses the FS-services API of the OS to access the storage device, the OS carries out the following process:

(1) the OS launches an application, creates a process, and gives the process a process ID (or PID);
(2) when a process attempts to access the storage device for the first time, and calls the FS-services API of the OS, the OS receives the request, and attaches the PID (from a task manager list) to the request;
(3) the FS asks the OS for the identity of the application that is associated with the PID;
(4) the FS then updates the appropriate PID in a PID field in each of the lines of the AST that refers to the identified application;
(5) for every subsequent storage operation of the designated PID, the FS then locates the relevant line in the AST according to the file type and the operation; and
(6) the FS then retrieves the storage requirements from the AST that are suitable for the application scenario (note that in doing so, the present invention makes use of the file name as taught by the prior art mentioned above).

At this stage, the storage requirements for the current storage operation are known to the FS. The process continues according to one of two alternative methods. In the first method, the storage device provides the SAT information to the host system, and in the second method, the host system provides the AST information to the storage device. The next step according to the first method is the following:

(7a) the SAT resides in the host system, and the FS matches the storage requirements of the AST and the storage attributes of the SAT. The FS selects the preferred sub-area, and instructs the storage device to use that storage sub-area with the storage command.

The step of 7a is preferred when predetermined physical and logical areas are used, and the SAT is not dynamic.

The second method does not export the SAT to the host system. Thus, the host system does not specify the storage sub-area. The next step according to the second method is the following:

(7b) the SAT resides in the storage device, and the host system sends the storage requirements with the storage command. A device controller then applies the SAT to select the storage sub-area.

The step of 7b is preferred when the storage device selects the appropriate storage sub-areas internally without the knowledge of the host system. It should be noted that such a method is not transparent to the host system (i.e. the host system must know that the storage device is managing an SAT, and must provide the storage requirements with every storage command). It should be noted that the FS is executed in the storage device, as in object-oriented storage using MTP (media transfer protocol by Microsoft), and that both the AST and the SAT are managed on the storage device. The host system only needs to provide the application name with the storage command.

It should be noted that the present invention does not require the use of all three application-scenario parameters (i.e. application, file type, storage operation). The system can take into consideration only the application, the file type, the storage operation, or any combination thereof. This is performed when populating the AST.

Therefore, according to the present invention, there is provided for the first time a method for accessing files in a digital storage device, the method including the steps of: (a) providing an application having an application identity; and (b) adjusting a storage mode of a file according to the application identity upon the application accessing the file.

Preferably, the step of providing includes providing a PID that is an indicator of the application identity.

Preferably, the step of adjusting includes adjusting the storage mode according to a storage command associated with an application scenario of the application.

Preferably, the step of adjusting is performed using an SAT.

Preferably, the step of adjusting is performed using an AST.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for managing files according to application. The principles and operation for managing files according to application, according to the present invention, may be better understood with reference to the accompanying description and the drawings.

Figure 1:
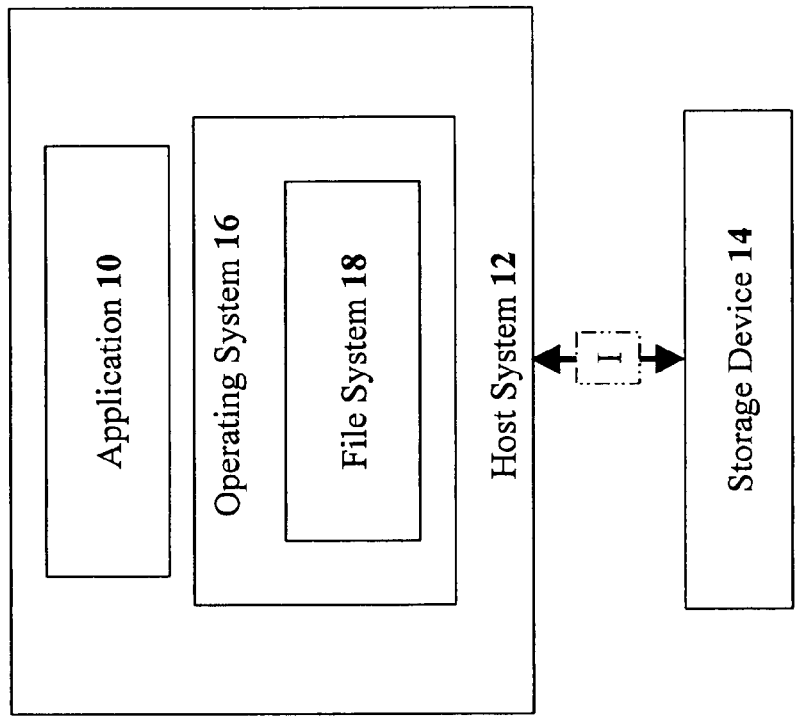
FIG. 1 is a schematic block diagram of a storage system having application access to a storage device, according to the prior art.

Referring now to the drawings, FIG. 1 is a schematic block diagram of a storage system having application access to a storage device, according to the prior art. An application 10 is executed on a host system 12, and tries to access a storage device 14. Application 10 calls the FS-services API of an operating system 16 in order to send an access request to storage device 14 through a file system 18. The operations of application 10 are executed on host system 12.

The role of operating system 16 in host system 12 is to manage all the software executed on host system 12 (including applications and device drivers). Host system 12 is responsible for executing the processes and allocating CPU time to each process when multiple processes are executed simultaneously (e.g. multi-threading and multi-tasking). In order to do so, operating system 16 maintains a list of all current "live" processes on host system 12. Such live processes are processes that have been launched and have not yet been terminated.

The processes list includes the process ID (or PID, a number that a process gets every time it is launched by operating system 16), the application file name (from which the process was generated during application launch), the priority (according to which) operating system 16 allocates CPU time to the process, the number of threads in the process, the stack, the heap size, and other parameters. All of these parameters enable operating system 16 to execute the process in a system that handles more than one process.

Operating system 16 is responsible for executing all the software modules (known in the art as software applications and software device drivers). Device drivers such as file system 18, which communicates with storage device 14 by sending commands via a physical interface I, are responsible for accessing hardware peripherals (known in the art as hardware devices or drives) connected to host system 12. Operating system 16 is also responsible for providing an interface between applications and drivers that are executed on host system 12. In order to provide this capability, every call to a driver is received by operating system 16, and is directed to the relevant driver. It will be appreciated that device drivers such as file system 18 might be implemented as software or firmware, e.g., a program stored on one or more computer-readable media which are non-transitory, in an example embodiment.

When application 10 tries to access storage device 14, the FS-services API of operating system 16 is called and exported by file system 18 to operating system 16. Operating system 16, which is responsible for executing processes on host system 12, receives the PID of the currently-executed process. Operating system 16 then attaches the PID to the request received from application 10, and sends the request to file system 18.

Application 10, which uses the FS-services API of operating system 16, designates a file or directory to be deleted, renamed, created, read, or written, and provides the file name or directory name as an input parameter. When file system 18 gets a request (from operating system 16) to open a file to read or write, file system 18 finds the location of the file in storage device 14, reads the file attributes, and collects relevant information about the file (e.g. size and security attributes).

File system 18 creates a specific data structure for the open file from the collected data. A pointer to the data structure (known in the art as a "file handle") is passed to application 10 through operating system 16. The next time that application 10 tries to access (e.g. read or write) the open file, application 10 sends the file handle (as opposed to the file name) as an input parameter.

The above description is a typical and well-known data-management process of the prior art, and is presented as background for understanding the present invention and the terminology that is used herein.

Tables 1A and 1B above help to highlight problems with methods of the prior art that determine storage attributes of a command based solely on file type. Tables 1A and 1B show two examples in which a single file type should be handled differently by the host system in different application scenarios.

Table 1A shows how two different application scenarios that need to read the same file would preferably differ from each other in buffer size, DMA use, and reading sequence. The ActiveSync application executed on a handset/PDA is responsible for moving data from handset/PDA local storage to PC local storage. ActiveSync is executed from the handset/PDA, and communicates with the PC via a USB connection. In Table 1A, the ActiveSync application scenario includes reading an MP3 data file located on the handset/PDA local storage, and sending the file to the PC. ActiveSync prefers, from a user perspective, to read an MP3 file as fast as possible, and send the file as fast as possible to the PC. As a result, ActiveSync prefers high-speed reading from the handset/PDA local storage.

The Windows Media Player (WMP) application scenario includes accessing the same MP3 file. The WMP application is executed on a handset/PDA. The WMP application is responsible for reading MP3 and MPEG files from handset/PDA local storage, and sending the files to an audio/video player. Since MP3-playing performance requires 16 KB/sec, the WMP would expect a very low read performance (unlike ActiveSync), but may require a constant bit rate from the handset/PDA local storage, so that the user will not hear "hiccups" (e.g. skips and pauses) when the song is playing.

Hiccups occur if the storage is performing a housekeeping operation while the WMP requests new data. Such a conflict causes the WMP to get the data with a delay (until the storage completes or suspends the housekeeping operation). Due to such delays, the WMP is unable to provide the player with the content on time, and the missing data sounds to the user like an undesirable noise or hiccup. In this scenario, the WMP would greatly prefer, prior to reading the MP3 file, to request that the storage refrain from performing any housekeeping operation until the WMP completes the reading of the MP3 file. When the WMP completes reading the MP3 file, the WMP sends the storage a "release" to continue the housekeeping operation.

Table 1B shows another example of an application-dependent storage requirement. The ActiveSync application scenario includes receiving a Microsoft Word document from the PC (via a USB connection), and trying to write the data as fast as possible into the handset/PDA local storage, requiring fast-write performance.

The MS-Word application scenario includes executing the Word editor on the handset/PDA local storage. The Word editor tries to write only a part of the document at a time (e.g. the modified part that has just been updated by the handset user). Since Word documents are frequently updated, the Word editor would prefer to write the partial Word document to a storage sub-area that supports high endurance (i.e. a high number of erase cycles and a low error probability). Storing Word document to a low-endurance storage sub-area might cause unrecoverable errors in the file. In contrast, since the user's input is manual and slow, a high write-speed is not needed in the Word application scenario.

TABLE 2

An exemplary SAT (Storage Attributes Table), according to a preferred embodiment of the present invention.

| | Storage Sub-Area A: Cache Sub-Area | Storage Sub-Area B: Multimedia Sub-Area |
|---|---|---|
| Range of Logical or Virtual Sub-Area: | Virtual Sub-Area of 8 MB | Sector 0-Sector 800 Sector 1000-Sector 1200 |
| Read Performance | N/A | Low, but constant bit rate |
| Write Performance | Fast | Low, but constant bit rate |
| Endurance | High | Low |
| Power Saving | Low | High |
| Security | Lowest | DRM type |

Table 2 is an exemplary SAT for two storage sub-areas provided by a storage device. Table 2 presents the different attributes (e.g. read performance, endurance, and security) of the virtual or logical sub-areas of the storage device. Storage sub-area A, called "cache sub-area", is intended for cache data (i.e. data that is written to the storage device at a very high speed). Examples of cache-data applications include capturing multi-shot images in a digital camera, and storing the images without any delay. In some cases, the storage device cannot meet the high write-performance required of the application scenario, but can overcome the problem by trading storage-density for storage-speed performance.

Writing x bytes of data at a very high speed can be done if 2× bytes are allocated for the data (e.g. by using an SLC sub-area instead of an MLC sub-area). Using the example of an SLC sub-area, the virtual cache sub-area is limited to 8 MB (which are derived from 16 MB by allocation of 2× bytes for every x bytes that are actually written). Consequently, when an application scenario needs to write data at high speed, the data can be directed to the cache sub-area. When the storage operation is completed, the storage device can move the data internally from the cache sub-area to a different storage sub-area (e.g. to economize on storage space). Reading or writing to the cache sub-area is a very intensive operation (i.e. the storage resources are working at full speed). Therefore, storage power-consumption is very high. An application scenario that seeks a low power-consuming operation would avoid using the cache sub-area.

Table 2 indicates that the cache sub-area is not used for read operations. The cache sub-area also provides high endurance (typically 10,000 erase cycles as compared to 1,000 erase cycles in low-endurance storage sub-areas). The cache sub-area is typically a low-security storage sub-area because encryption processes are not fast, and because the cache sub-area is typically accessible by many applications.

Storage sub-area B in Table 2, called "multimedia sub-area", is used for reading and writing data to storage at a low speed, but with a constant bit rate and for a long period of time (e.g. from a few minutes up to two hours). Video capture and playback each require a bit-rate performance of 250 KB per second. MP3 playback requires a bit-rate performance of up to 16 KB per second.

In the example of storage sub-area B of Table 2, the multimedia sub-area includes two sequential logical sub-areas. The first logical sub-area starts with sector and ends in sector 800; the second sequential logical sub-area starts with sector 1000 and ends in sector 1200. These properties make the multimedia sub-area suitable for writing and reading multimedia files. The storage device manages the multimedia sub-area without "hiccups" by ensuring that the read and write operations are not interrupted by housekeeping operations.

Since multimedia files are typically written once and archived for playing, and are never updated or modified until they are deleted, the multimedia sub-area provides low endurance (e.g. 1,000 erase cycles compared to 10,000 for high endurance), while still enabling the life expectancy of multimedia content on a storage device to be relatively long. Furthermore, since multimedia files are recorded and played back repeatedly (requiring, as mentioned above, a very low read/write performance), the multimedia sub-area provides the feature of very low power-consumption (e.g. by decreasing the clock frequency of the storage controller to a magnetic disk or flash memory). A multimedia sub-area that handles DRM files would be required to provide a higher security level (e.g. encryption/decryption of written/read data).

Table 2 exemplifies how two different storage sub-areas in the same storage device differ significantly in storage attributes, and are used in different application scenarios, according to preferred embodiments of the present invention. Methods of the prior art do not provide any ability to customize a storage sub-area to an application scenario.

scenario; and a section C contains the required attributes of the application scenario for optimal access of the storage device.

Application-scenario parameters required by the application scenario of the storage mode that are exemplified in the AST of Table 3 are:

Read speed—aspects of the speed required for reading data for the specified application (e.g. average speed, peak speed, and constant bit rate).

Write speed—aspects of the speed required for writing data for the specified application (e.g. average speed, peak speed, and constant bit rate).

Priority (on an arbitrary scale, e.g. 1-10)—a ranking of the specified application scenario to be served relative to other application scenarios (given other factors being equal). According to this parameter, the FS determines in what order of priority are application-scenario access-requests executed for requests that require access to storage at the same time. For example, in line 5, the Media Player (description of the application scenario is detailed below), which reads a song from the storage (in order to play the song), has the highest priority. Thus, any other application scenario that tries to access the storage at the same time as the Media Player is blocked until the request from the Media Player is served by the storage.

Timing punctuality—relative criticality that commands are carried out "just in time" for various application scenarios. According to this parameter, the FS defines which storage command to execute prior to other storage commands competing for service. In some cases, the FS may suspend a request coming from an application scenario with a lower timing punctuality in order to meet the timing punctuality of an application scenario with a

TABLE 3

The data structure of an exemplary AST (Applications Scenario Table), according to a preferred embodiment of the present invention.

| Section A | | Section B | | | Section C | | | | | |
|---|---|---|---|---|---|---|---|---|---|---|
| Line Number | Process ID List | Application Name | File Type | Storage Operation | Read Speed | Write Speed | Priority (1-10) | Timing Punctuality | Endurance | Power Saving | Security | Buffer Size per Transaction |
| 1 | 23, 34 | MS Word in Office Pro | DOC | Write | N/A | Low | 3 | Low | High | Low | High | Small |
| 2 | 12 | ActiveSync | JPG | Write | N/A | High | 8 | Med | Low | Low | High | Large |
| 3 | 12 | ActiveSync | PST | Write | N/A | High | 8 | Med | High | High | High | Small |
| 4 | 54, 7 | Media Player (DRM Support) | MPG | Write | N/A | High | 7 | Low | Low | Low | High | Large |
| 5 | 54 | Media Player | MPG | Read | Low | N/A | 10 | High | Low | High | High | Large |
| 6 | 26 | Video Recorder | MPG | Write | N/A | Low | 9 | High | Low | High | Low | Small |
| 7 | 44 | Photo Album | JPG | Read | High | N/A | 6 | Med | Low | High | Low | Large |

Table 3 shows the data structure of an exemplary AST, according to a preferred embodiment of the present invention The rows of Table 3 represent individual application scenarios (e.g. MS-Word running in Office Pro for writing documents; and ActiveSync for receiving data from a PC, and writing the data into a storage device).

The columns of Table 3 are divided into three sections: a section A contains line numbers used for administrative purposes, and a list of PIDs that link the running processes to the associated applications since there can be more than one instance of an application running at the same time for each application scenario (e.g. lines 2 and 3 are multiple processes of the same application); a section B contains the three application-scenario parameters that determine the application higher timing punctuality. For example, in line 5, the Media Player, which reads a song from the storage (in order to play the song), has a high timing punctuality (since a song should be played at a constant bit rate; otherwise, the user will hear the song with interruptions). When the ActiveSync application scenario of line 2 tries to access the storage at the same time that the Media Player tries to access the storage, ActiveSync will be blocked or suspended until the request from the Media Player is served by the storage.

Endurance—the number of updates (i.e. re-writing to the same sectors) that the specified application scenario is expected to apply to the stored data.

Power saving—a ranking of whether the specified application scenario should be served when the device is in a low power mode (e.g. operating on a battery).

Security—a ranking of whether the specified application scenario deals with secure data, and therefore, needs security-protected storage including encryption, for example.

Buffer size per transaction—a ranking of the typical size of data (in bytes) that the specified application scenario uses when sending data requests to storage. For example, a video-capturing application scenario sends data requests of 8 KB.

It is important to note that the PID field is the only dynamic field in Table 3. The PID field is updated once during application run-time (as described in FIG. 5).

Table 3 includes an application scenario generated during application launch from the "Office Pro" version of MS-Word (line 1). PID 23 is added to the PID field that already contains PID 34 from a concurrent instance of the application. This application scenario is characterized by the application ("Word in Office Pro"), by the operation (write), and by the content type (a Word document with the "DOC" file extension).

As described in Table 1B above, such an application scenario does not require high read-performance. The application scenario requires low write-performance, small buffer size for document updates (due to the possibility of frequent minor update scenarios), and high endurance. Word Office Pro is used by organizations that require enforcement of a security policy with regard to updating and distributing Word documents. Therefore, such an application scenario requires a high security level.

Table 3 includes an application scenario generated during application launch from ActiveSync (line 2). The application has a PID 12. This application scenario is characterized by the application (ActiveSync), the operation (write), and the content type (a picture file with the "JPEG" file extension).

As described in Table 1B above, such an application scenario requires no read-performance, high write-performance, a large buffer size during document updates (due to large sequential data-writing operations with no minor updates), and low endurance. ActiveSync is used to synchronize PCs with handsets/PDAs, and therefore requires enforcement of a security policy with regard to personal-data transfer operations (to ensure that not every handset can move personal data to every PC). As a result, the application scenario requires a high security level.

Table 3 includes an application scenario generated during application launch from ActiveSync (line 3). This instance of ActiveSync has the same PID 12 as specified in line 2. This application scenario is characterized by the application (ActiveSync), the operation (write), and the content type (a "PST" e-mail database file).

As described in Table 1B above, such an application scenario requires no read-performance, high write-performance; However, in contrast to the application scenario specified in line 2, this application scenario uses a small buffer size during database updates (due to small data-writing operations caused by frequent updates), and a very high endurance due to massive updates of the e-mail database. Due to the security policy of synchronizing e-mails from PCs to handsets/PDAs as mentioned with regard to line 2, the application scenario requires a high security level.

Table 3 includes two application scenarios generated during application launch from Windows Media Player (WMP) (lines 4 and 5, each having the same PID 54). Both applications are characterized by the WMP application and by the same content type (an "MPEG" video file). However, the application scenario in line 4 is characterized by the "write" operation; whereas, the application scenario in line 5 is characterized by the "read" operation.

The application scenario in line 4 represents a scenario of downloading a video file from the network, and writing the file into storage as fast as possible (read performance is not applicable in this case). Due to the requirement that the process of downloading and storing the file into storage should be completed as fast as possible, storage of the file cannot be performed in a power-saving mode, but rather with high write speed. Storage of the file requires large buffers due to the large amounts of data received from the network. Since an MPEG file is not usually modified during its lifetime (until deleted), neither updates nor modifications to the file are expected. For this reason, the application scenario can tolerate low endurance. The WMP application scenario that deals with DRM video files (line 4) should meet DRM protocols, requiring a high security level.

The application scenario mentioned in line number 5 describes an application scenario generated during application launch from the WMP application with PID 54. This application scenario consists of reading a file from storage, and sending the data to an audio speaker. The application scenario is characterized by the operation (read), and the content type (an MPEG file with the "MPG" file extension). It requires a low read speed of about 16 KB/sec (write performance is not applicable in this case), low endurance, high power saving, and a large buffer size. This application scenario requires a high security level for the same reason as the application scenario of line 4.

Table 3 includes an application scenario generated during application launch from Video Recorder (VR) with PID 26 (line 6). This application scenario is characterized by the application (VR), the operation (write), and the content type (an MPEG file with the "MPG" file extension). The VR application is executed on a handset/PDA. The VR application scenario is responsible for capturing video from a camera module, displaying video on the handset display, converting the data received from the camera module into MPEG format, and writing the MPEG data into the storage. The performance of video recording for MPEG is 8 KB/sec per frame with 30 captured frames per second. As a result, the VR application requires a very low write-performance (unlike the application scenario in line 4), but may require a constant bit rate from storage to prevent the user from noticing "hiccups" when watching the video. Consequently, the VR application requires the storage to disable housekeeping operations until the VR application completes capturing the MPG file.

According to the above details, the VR application scenario uses a small 8 KB buffer size, and can operate in high power-saving mode since the storage device can change the clock frequency from frame to frame (read performance is not applicable in this case). Since amateur video capture does not require any security policy, the application scenario requires a low security level (i.e. no encryption at all).

Table 3 includes an application scenario generated during application launch from Photo Album (PA) with PID 44 (line 7). This application scenario is characterized by the application (PA), the operation (read), and the content type (a JPEG file with the "JPG" file extension). This application scenario reads picture files from storage and displays them on a handset display as fast as possible. Therefore, the application scenario requires high read-performance, (write performance is not applicable in this case), uses a large buffer size, and requires very low endurance (since updates and modifications are not made to the pictures until they are deleted). There is no security policy for displaying pictures on a handset display. Thus, the application scenario requires a low security level (i.e. no encryption at all).

Figure 2:
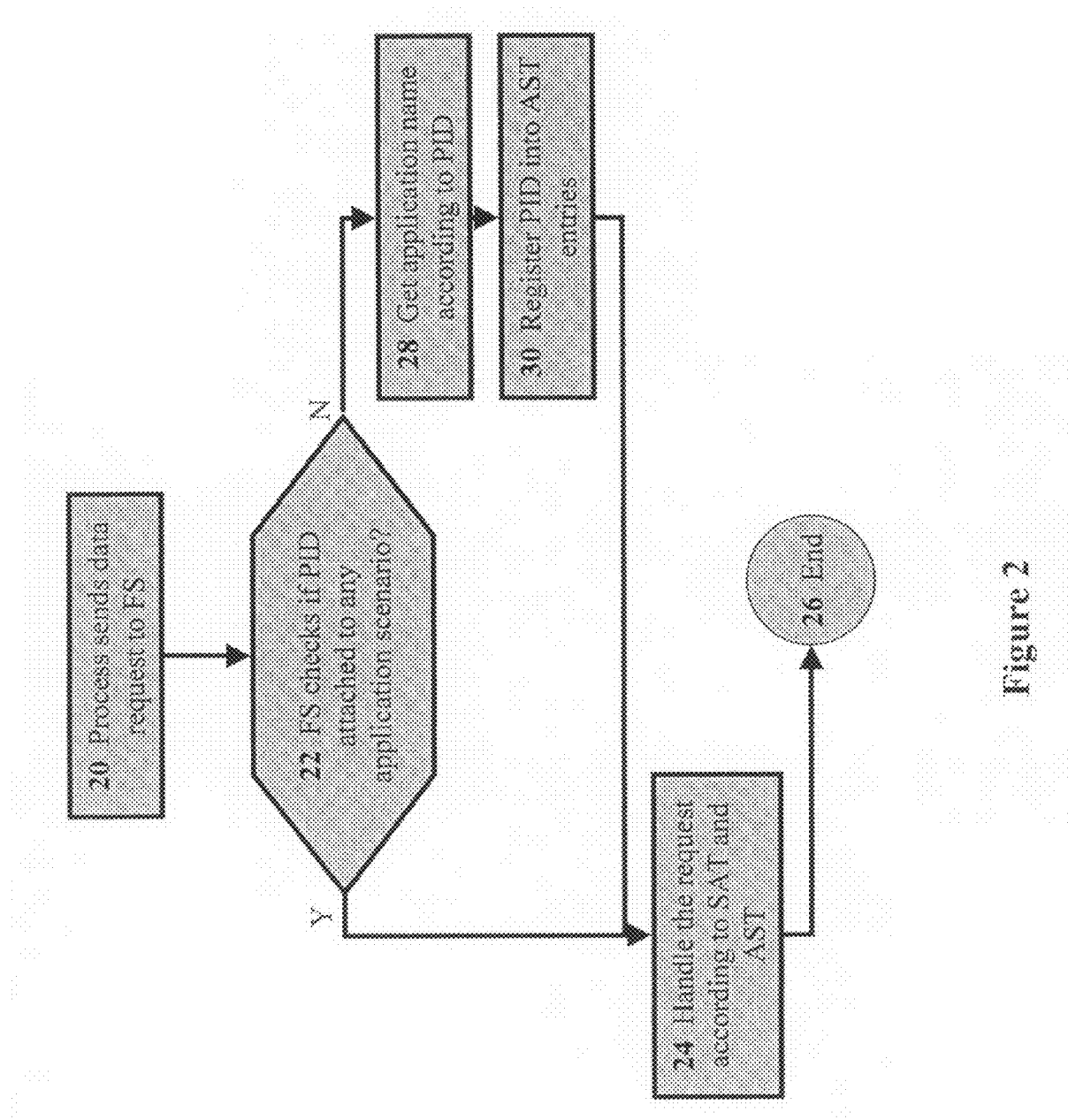
FIG. 2 is a simplified flowchart of an FS that automatically updates an associated AST PID field with the relevant PID, according to a preferred embodiment of the present invention.

FIG. 2 is a simplified flowchart of an FS that automatically updates its AST PID field with the relevant PID, according to a preferred embodiment of the present invention. FIG. 2 describes a process that tries to access a storage sub-area in which the application-scenario parameters of the process are updated in the AST. Such application-scenario parameters can be updated during development, when the developer knows the specific application and its application-scenario parameters (e.g. the WMP described in Table 1A), or during application run-time (as described in FIG. 4).

Every time a process sends a storage request through the FS-services API of the OS (Step 20), the OS sends the FS a request with an attached PID, as described above with regard to FIG. 1. The FS checks if the PID is listed in the PID field of one of the application scenarios in the AST (Step 22). If the PID appears, the FS executes the process request (Step 24), and the registration process comes to an end (Step 26). If it does not appear, then the FS sends a request to the OS (responsible for the processes list as described above with regard to FIG. 1) to get the application name according to the PID (Step 28). Once the FS gets the application name from the OS, the FS registers the process by updating the PID field in all application-scenario entries that include the relevant application name (Step 30). If the FS does not find any entry that corresponds to the application name, it does not update any field.

The FS then executes the request according the application-scenario parameters retrieved from the relevant application-scenario entries located in the AST (described in FIG. 3), or according to default parameters if corresponding entries are not found (Step 24). The registration process then comes to an end (Step 26).

Figure 3:
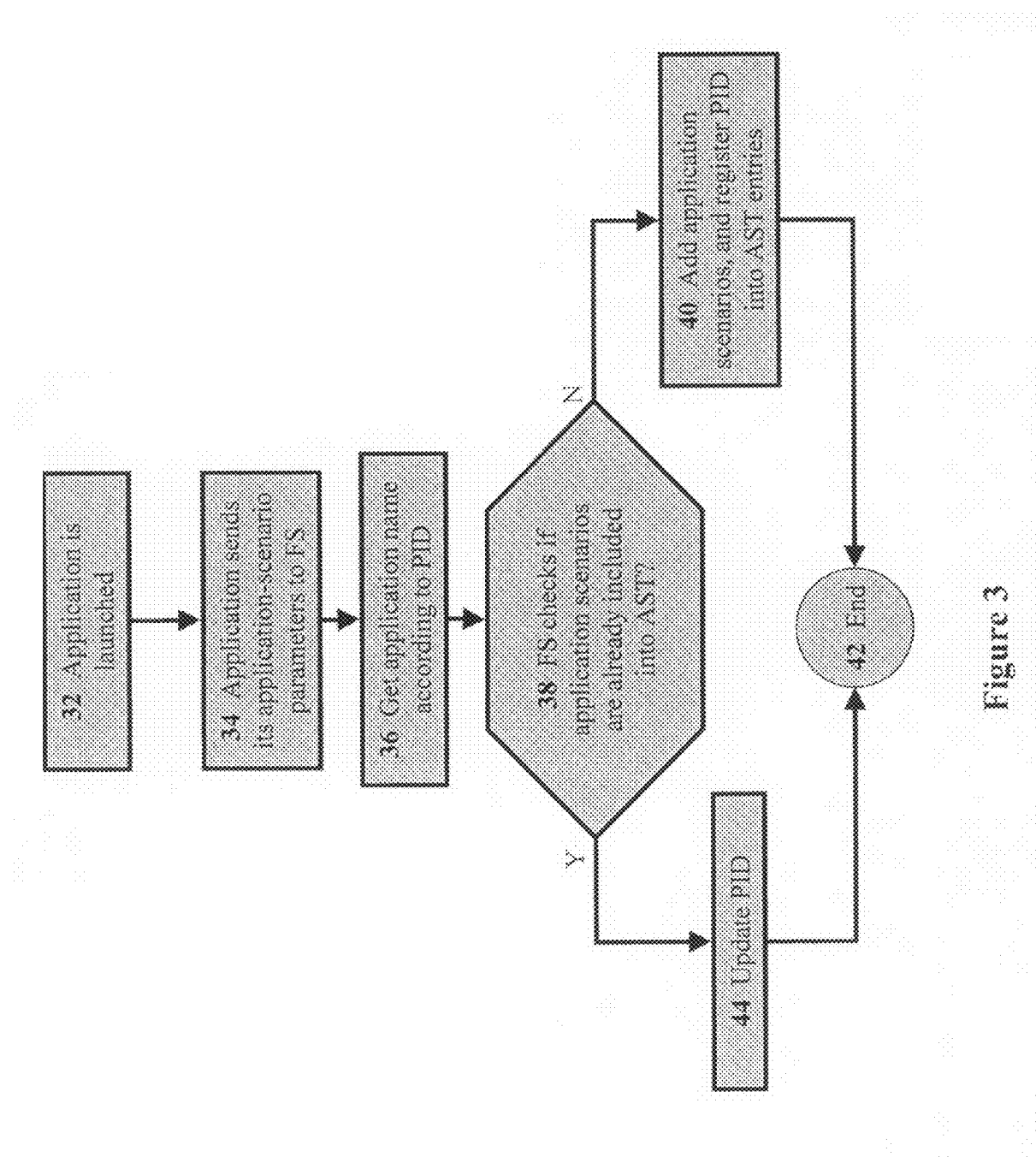
FIG. 3 is a simplified flowchart of application-scenario parameters that are sent by a process, and are updated during application run-time, according to a preferred embodiment of the present invention.

FIG. 3 is a simplified flowchart of application-scenario parameters that are sent by a process, and are updated in application run-time, according to a preferred embodiment of the present invention. FIG. 3 shows how a process, whose application-scenario parameters have not been updated into the AST during development, sends the application-scenario parameters to be updated in the AST in application run-time.

Once the application is launched (as described above with regard to FIG. 1) (Step 32), the process sends the application-scenario parameters to the FS through the FS-services API of the OS (Step 34). The OS sends the request attached with the PID) (as described above with regard to FIG. 1) to the FS. The FS sends a request to the OS (responsible for the processes list as described above with regard to FIG. 1) to get the application name according to the PID (Step 36). Once the FS gets the application name from the OS, the FS checks in the AST if there are any application-scenario entries with an application-name field identical to the application name that the FS received from the OS (Step 38).

If there are no application-scenario entries in the AST with the same application name, then the FS adds the application-scenario parameters into the AST (Step 40). At the same time, the FS updates the PID in the new application-scenario entries. The process of updating application-scenario parameters into the AST then comes to an end (Step 42).

If there are application-scenario entries in the AST (as verified in Step 38) with the same application name, then the FS just updates the PID by updating the appropriate PID field in the AST in the relevant application-scenario entries (Step 44). The process of updating application scenarios parameters into the AST then comes to an end (Step 42).

Figure 4:
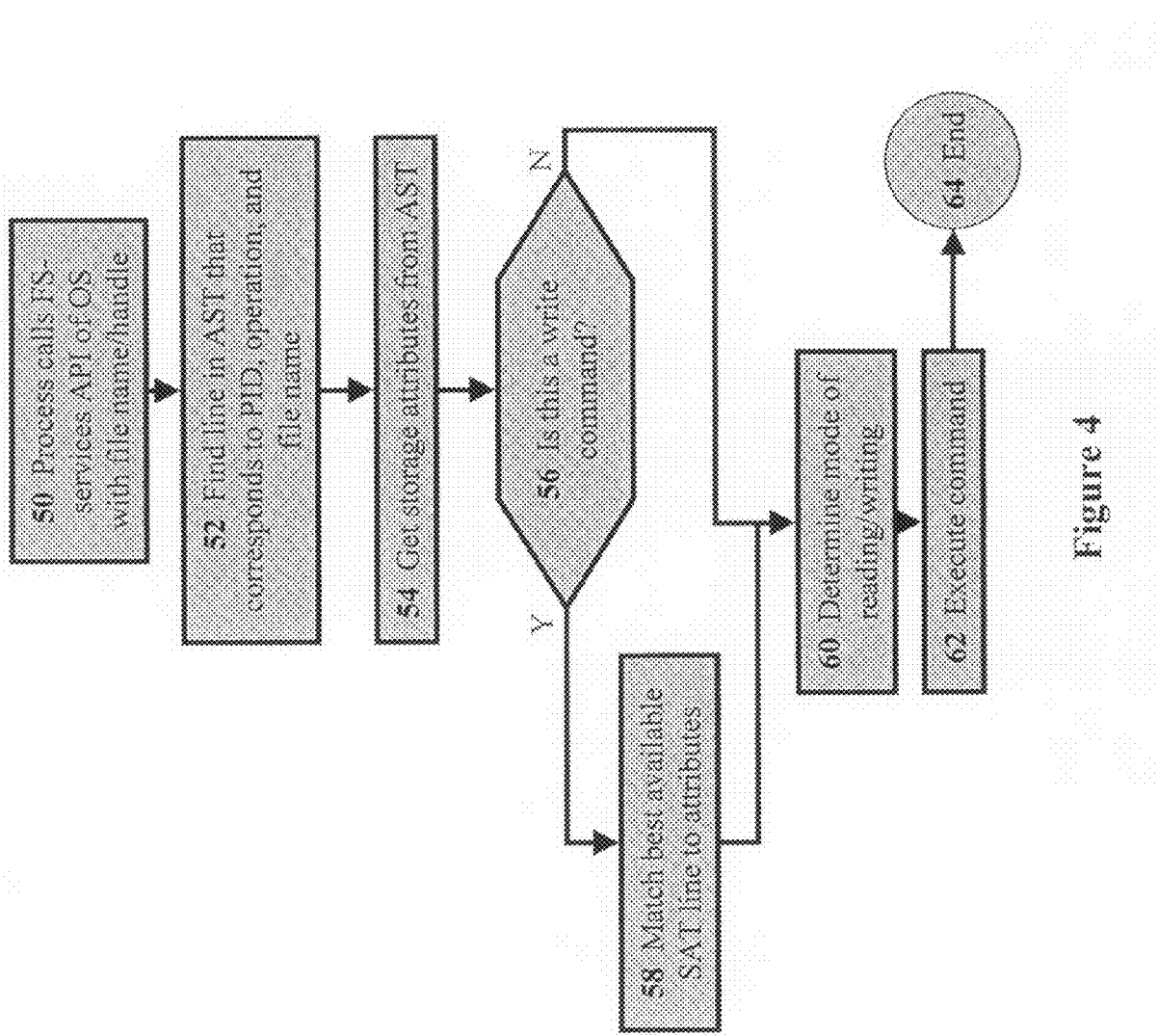
FIG. 4 is a simplified flowchart of the processing of a storage request, according to a preferred embodiment of the present invention.

FIG. 4 is a simplified flowchart of the processing of a storage request, according to a preferred embodiment of the present invention. FIG. 4 shows how the FS directs data (sent or requested by a process) to and from the relevant storage sub-area. A process calls an FS-services API of the OS with file name or file handle (described above with regard to FIG. 1) (Step 50). The OS sends to the FS a request with an attached PID (as described above with regard to FIG. 1). The FS searches for an appropriate application scenario listed in the AST that matches the storage request received from the process according to PID, the operation type (e.g. read, write, create, delete, and rename), and the file name (Step 52). File name can also be derived from the file handle by the FS, as described above with regard to FIG. 1.

The FS then reads the relevant application-scenario parameters from the AST (Step 54). Next, the FS checks if the request is a write command or not (Step 56). If the request is a write command, the FS looks in the SAT sub-area parameters, and tries to find an available storage sub-area with attributes that best match the attributes that were read from the AST (Step 58). If the request is a read command, then the FS continues to the next step in the procedure.

The FS then determines a storage mode according to the desired AST parameters (described in Table 3), and the matching SAT sub-area parameters (described in Table 2) provided by the storage sub-area (Step 60). Lastly, the FS executes the command received from the process in Step 50 (Step 62), and the data request by the FS comes to an end (Step 64).

While the invention has been described with respect to a limited number of embodiments, it will be appreciated that many variations, modifications, and other applications of the invention may be made.

What is claimed is:

1. A method, comprising:
receiving a request from an operating system, the request having a process identifier;
searching an application scenario table (AST) to match the process identifier of the request with an application scenario associated with the process identifier, the AST having multiple sections, a first section containing parameters defining application scenarios, the parameters including an application name, a file type, and a storage operation;
matching (a) storage requirements associated in the AST with the storage operation of the application scenario with (b) storage sub area attribute values in a storage attributes table (SAT), the SAT providing attribute values for at least two different storage sub areas in a flash memory of the digital storage device, wherein the storage requirements include timing punctuality and power saving, and wherein the attribute values differ for the at least two different storage sub areas; and
selecting a storage sub area in the flash memory for the file in the digital storage device based on the matching of the storage requirements, wherein each operation is executed by a processor.

2. The method of claim 1, wherein if the searching fails to find the process identifier, then the method includes,
requesting the application name from the operating system;
searching the AST for the application scenario having the application name; and
updating application scenarios in the AST for each found application scenario having the application name to include the process identifier of the request.

3. The method of claim 1, wherein the AST includes a section listing a process identifier for each application name and wherein multiple process identifiers may be assigned to each application scenario.

4. A method, comprising:
- receiving a request from an operating system, the request having a process identifier;
- searching an application scenario table (AST) to match the process identifier of the request with an application scenario associated with the process identifier, the AST having multiple sections, a first section containing parameters defining application scenarios, the parameters including an application name, a file type, and a storage operation;
- matching (a) storage requirements associated in the AST with the storage operation of the application scenario with (b) storage sub area attribute values in a storage attributes table (SAT), the SAT providing attribute values for at least two different storage sub areas in a flash memory of the digital storage device, wherein the storage requirements include timing punctuality and endurance, and wherein the attribute values differ for the at least two different storage sub areas; and
  - selecting a storage sub area in the flash memory for the file in the digital storage device based on the matching of the storage requirements, wherein each operation is executed by a processor.

5. The method of claim 2, wherein if the application name is not found, the method includes,
- updating the AST during run time with parameters associated with the process identifier.

6. One or more computer readable media, which are non-transitory, storing a program, wherein the program, when executed, instructs a processor to perform the following operations:
- receive a request from an operating system, the request having a process identifier;
- search an application scenario table (AST) to match the process identifier of the request with an application scenario associated with the process identifier, the AST having multiple sections, a first section containing parameters defining application scenarios, the parameters including an application name, a file type, and a storage operation;
- match (a) storage requirements associated in the AST with the storage operation of the application scenario with (b) storage sub area attribute values in a storage attributes table (SAT), the SAT providing attribute values for at least two different storage sub areas in a flash memory of the digital storage device, wherein the storage requirements include timing punctuality and power saving or timing punctuality and endurance, and wherein the attribute values differ for the at least two different storage sub areas; and
- select a storage sub area in the flash memory for the file in the digital storage device based on the matching of the storage requirements.

7. The computer-readable media of claim 6, wherein if the searching fails to find the process identifier, then the operations further include operations to:
- request the application name from the operating system;
- search the AST for the application scenario having the application name; and
- update application scenarios in the AST for each found application scenario having the application name to include the process identifier of the request.

8. The computer-readable media of claim 6, wherein the AST includes a section listing a process identifier for each application name and wherein multiple process identifiers may be assigned to each application scenario.

9. The computer-readable media of claim 7, wherein if the application name is not found, then the operations further include operations to:
- update the AST during run time with parameters associated with the process identifier.

\* \* \* \* \*